(12) United States Patent
Strahm, Jr.

(10) Patent No.: US 8,444,221 B2
(45) Date of Patent: May 21, 2013

(54) BOOSTER SEAT ASSEMBLY

(75) Inventor: Jack Alan Strahm, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 373 days.

(21) Appl. No.: 12/875,164

(22) Filed: Sep. 3, 2010

(65) Prior Publication Data

US 2012/0056457 A1 Mar. 8, 2012

(51) Int. Cl.
*A47C 15/00* (2006.01)
*A47C 1/08* (2006.01)

(52) U.S. Cl.
USPC .................. 297/250.1; 297/248; 297/232

(58) Field of Classification Search
USPC .................. 297/233, 234, 248, 250.1, 232
See application file for complete search history.

(56) References Cited

U.S. PATENT DOCUMENTS

| | | | |
|---|---|---|---|
| 5,518,293 A | 5/1996 | Coy et al. | |
| 5,997,085 A | 12/1999 | MacLiver | |
| 6,260,903 B1 * | 7/2001 | von der Heyde | 297/248 X |
| 7,407,226 B2 | 8/2008 | Macliver | |
| 7,883,149 B1 * | 2/2011 | Weiss et al. | 297/248 X |
| 2007/0108812 A1 | 5/2007 | Haun et al. | |
| 2008/0211278 A1 | 9/2008 | Macliver | |

* cited by examiner

*Primary Examiner* — Anthony D Barfield
(74) *Attorney, Agent, or Firm* — Clifford Vaterlaus; Emerson Thomson Bennett

(57) ABSTRACT

A booster seat assembly may be used with a bench seat assembly and with a seat belt assembly for each occupant. The booster seat assembly may support at least two child sized occupants and may permit each child sized occupant to access the seat belt assembly for self latching and self unlatching.

19 Claims, 4 Drawing Sheets

BOOSTER SEAT ASSEMBLY

I. BACKGROUND

A. Field of Invention

This invention generally relates to methods and apparatuses concerning booster seats and more specifically relates to methods and apparatuses concerning an automotive booster seat assembly that can accommodate multiple children.

B. Description of the Related Art

It is well known in the automotive industry to provide infant car seats to secure infants to passenger vehicles and to provide booster seats to secure children who are too big for infant car seats but are not big enough to sit in the vehicle seats without seating assistance. While known booster seats generally work well for their intended purposes, they create a problem when it is desirable to secure multiple children to a vehicle.

In order to secure multiple children to a vehicle, multiple individual booster seats are required. If multiple booster seats are placed into a single row, such as on a bench seat, a seat belt extender may be used to raise the height of the female receptacle to allow hand access so that each child may latch and unlatch the seat belt assembly themselves. The armrests on individual booster seats, however, consume valuable packaging space. FIG. 4 illustrates the problem—the width of the rear seats, especially in the third row of SUVs and vans, typically is not sufficient to accommodate more than two booster seats. As shown, the width W1 of the rear seats 4 is less than the width W2 of three individual booster seats 1, 2, 3.

Even if three individual booster seats can fit onto a seat row, the armrest structure does not provide the child with hand access to latch and unlatch the seat belt assembly themselves—especially when the seat belts have soft straps and are sunk relatively low down into the seat. As shown, the armrests 5, 6 block hand access to the female belt receptacles 7, 8.

As family sizes increase and traffic safety laws are revised to extend the length of time children are required to sit in booster seats, there is a need to provide for a single booster seat that can accommodate multiple children.

II. SUMMARY

According to one embodiment of this invention, a booster seat assembly may be for use with an associated bench seat assembly that comprises: a bench seat base portion including an occupant contact surface that is suitable for contacting and supporting at least two associated adult sized occupants; and, a bench seat back portion including an occupant contact surface that is suitable for contacting and supporting the at least two associated adult sized occupants. The booster seat assembly may also be for use with an associated seat belt assembly for each of the associated adult sized occupants and suitable for restraining each of the associated adult sized occupants to the bench seat assembly. Each seat belt assembly may comprise: a female receptacle that extends above the bench seat base portion; a seat belt; and, a male element that is attached to the seat belt and that is latchable to the female receptacle to restrain the associated adult sized occupant and that is unlatchable from the female receptacle to release the associated adult sized occupant. The booster seat assembly may comprise: a booster seat base portion that is suitable to be supported to the occupant contact surface of the bench seat base portion and that includes an occupant contact surface that is suitable for contacting and supporting at least two associated child sized occupants; and, a first opening formed in the booster seat base portion that receives one of the female receptacles. The booster seat assembly may be suitable to support each associated child sized occupant to the vehicle by contacting each associated child sized occupant to the booster seat base portion and by contacting each associated child sized occupant to the bench seat back portion. The booster seat assembly may also be suitable to permit each associated child sized occupant to access a corresponding male element and female receptacle for self latching and self unlatching of the corresponding seat belt assembly.

According to another embodiment of this invention, a method may comprise the steps of: (A) providing a bench seat assembly comprising: a bench seat base portion including an occupant contact surface that is suitable for contacting and supporting at least two associated adult sized occupants; and, a bench seat back portion including an occupant contact surface that is suitable for contacting and supporting the at least two associated adult sized occupants; (B) providing a seat belt assembly for each of the associated adult sized occupants and suitable for restraining each of the associated adult sized occupants to the bench seat assembly, each seat belt assembly comprising: a female receptacle that extends above the bench seat base portion; a seat belt; and, a male element that is attached to the seat belt and that is latchable to the female receptacle to restrain the associated adult sized occupant and that is unlatchable from the female receptacle to release the associated adult sized occupant; (C) providing a booster seat assembly comprising: a booster seat base portion that includes an occupant contact surface that is suitable for contacting and supporting at least two associated child sized occupants and that has a first opening; (D) placing the booster seat base portion onto the occupant contact surface of the bench seat base portion with the first opening receiving one of the female receptacles; (E) placing a first child sized occupant onto the occupant contact surface of the booster seat base portion and against the occupant contact surface of the bench seat back portion; and, (F) permitting the first child sized occupant to access a corresponding male element and female receptacle for self latching and self unlatching of the corresponding seat belt assembly.

According to yet another embodiment of this invention, a vehicle may comprise: a frame; at least one ground engaging wheel mounted to the frame; a locomotion source mounted to the frame and used in providing locomotion for the vehicle; a body that is supported to the frame and that defines a passenger compartment; a vehicle bench seat assembly supported to the frame and positioned within the passenger compartment, the vehicle bench seat assembly comprising: a bench seat base portion including an occupant contact surface that is suitable for contacting and supporting at least three associated adult sized occupants; a bench seat back portion including an occupant contact surface that is suitable for contacting and supporting the at least three associated adult sized occupants; a seat belt assembly for each of the associated adult sized occupants and suitable for restraining each of the associated adult sized occupants to the vehicle bench seat assembly, each seat belt assembly comprising: a female receptacle that is supported to the frame and extends above the bench seat base portion; a seat belt supported to the frame; and, a male element that is attached to the seat belt and that is latchable to the female receptacle to restrain the associated adult sized occupant and that is unlatchable from the female receptacle to release the associated adult sized occupant; and, a booster seat assembly comprising: an attachment surface suitable to support the booster seat assembly to the frame; a booster seat base portion that is supported to the occupant contact surface of the bench seat base portion and that includes an occupant contact surface that is suitable for contacting and supporting at least three associated child sized occupants; at least four armrests, each having an armrest contact surface, that extend from the booster seat base portion and that define three child sized occupant seating areas; and, first and second openings formed in the booster seat base portion, the first opening receiving two of the female receptacles and the second opening receiving the third female receptacle. The booster seat assembly may be suitable to support each associated child sized occupant to the vehicle by contacting each associated child sized occupant to the booster seat base portion within one of the child sized occupant seating areas and by contacting each associated child sized occupant to the bench seat back portion. The booster seat assembly may also be suitable to permit each associated child sized occupant to access a corresponding male element and female receptacle for self latching and self unlatching of the corresponding seat belt assembly.

One advantage of this invention is that a single booster seat assembly can accommodate multiple child sized occupants.

Another advantage of this invention is that a child sized occupant positioned on the booster seat assembly can easily access a seat belt assembly for self latching and self unlatching.

Still another advantage of this invention is that a booster seat assembly can be easily installed to and removed from a bench seat assembly.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

Figure 4:
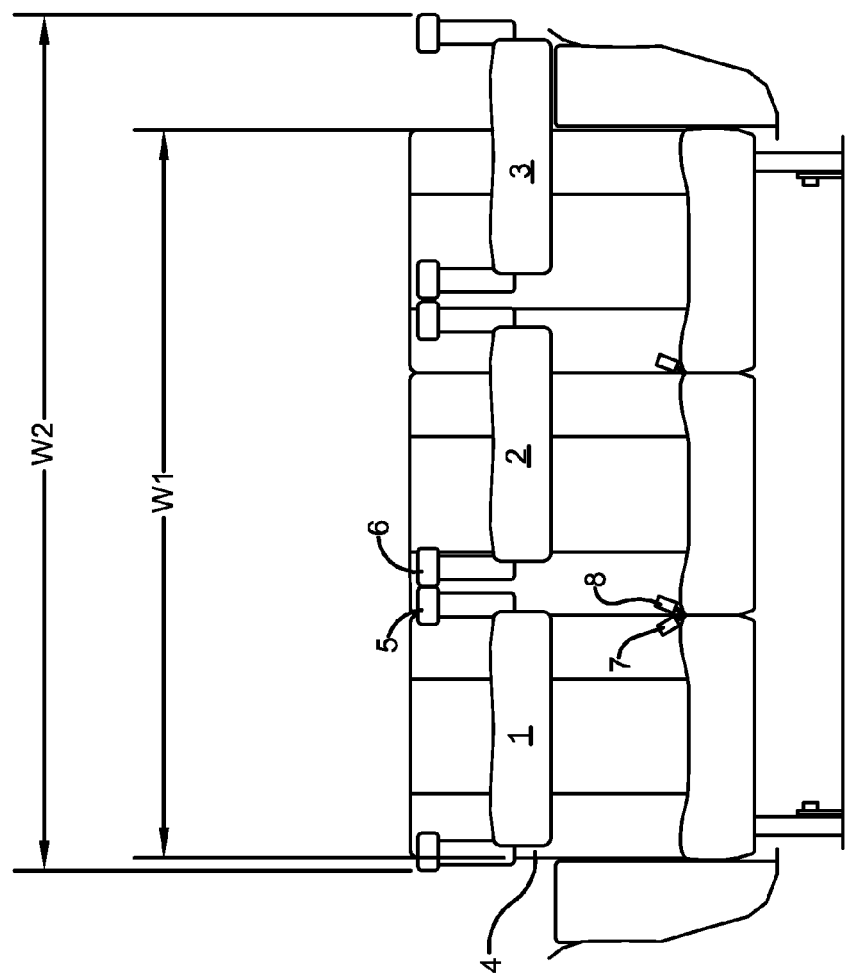

FIG. 4 a front view of a bench seat assembly showing that the width is not sufficient to accommodate more than two known booster seats.

IV. DETAILED DESCRIPTION

Figure 1:
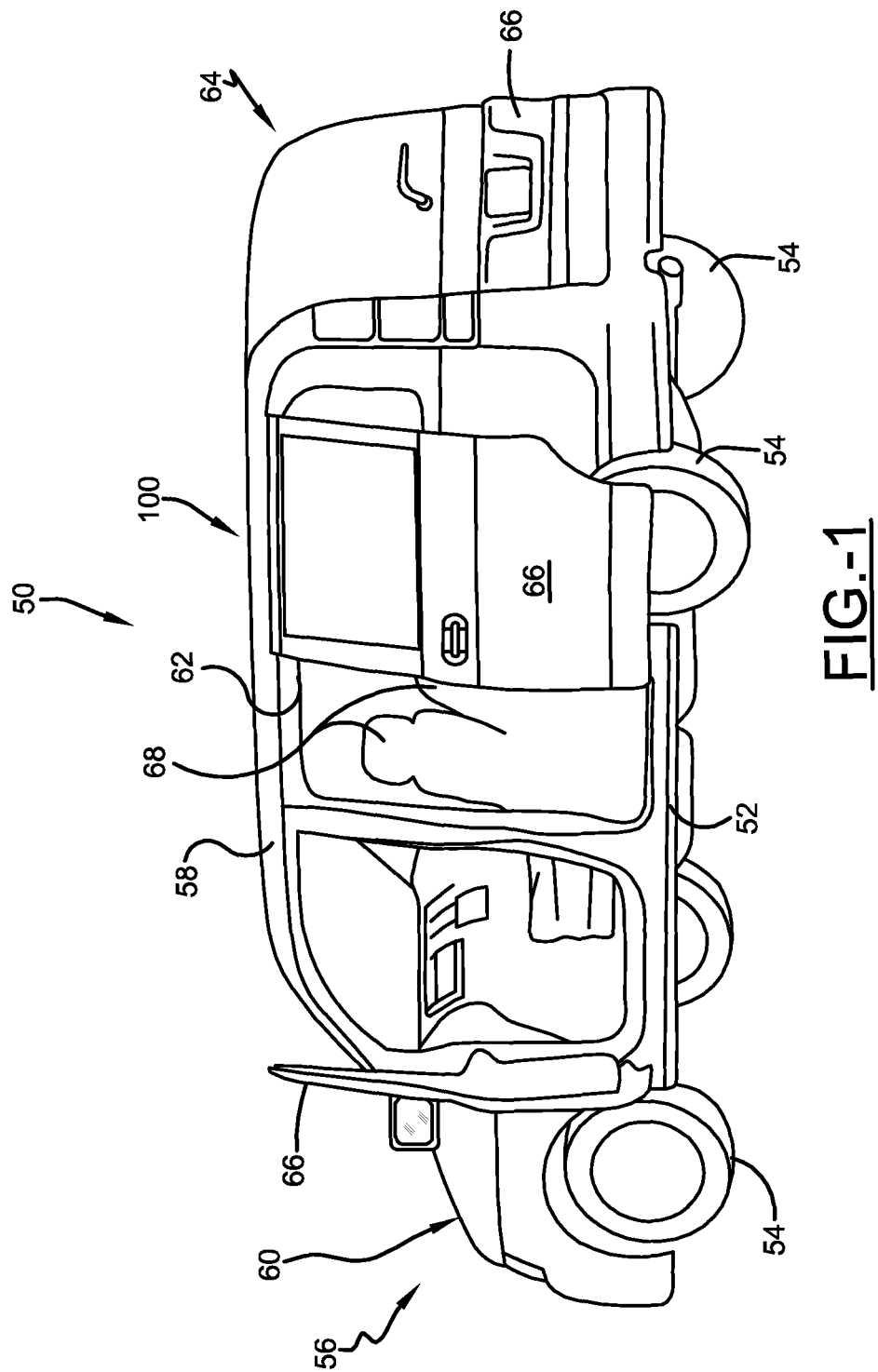
FIG. 1 is a perspective left side view of a vehicle.

Referring now to the drawings wherein the showings are for purposes of illustrating embodiments of the invention only and not for purposes of limiting the same, and wherein like reference numerals are understood to refer to like components, FIG. 1 shows a vehicle 50 that may be equipped with one or more booster seat assemblies 100 according to this invention. While the vehicle 50 shown is a van, it is to be understood that the booster seat assembly 100 of this invention will work with any vehicle chosen with the sound judgment of a person of skill in the art, including SUVs and sedans, and may have non-vehicle applications as well. The vehicle 50 may include a frame 52, one or more ground engaging wheels 54 mounted to the frame 52, and a locomotion source 56, such as an engine or motor, mounted to the frame 52, for use in providing locomotion for the vehicle 50. The vehicle 50 may also have a body 58 mounted to the frame 52 and that defines one or more compartments. The body may define, for some non-limiting examples, a locomotion compartment 60 that houses the locomotion source 56, a passenger compartment 62 that houses one or more passengers, and a storage compartment 64 that may be used to house luggage or other cargo. The vehicle 50 may also have at least one door 66 that is moveable with respect to the body 58 between an open position granting access to the interior of the body (and thus may provide access to one or more of the compartments 60, 62, 64) and a closed position preventing access to the interior of the body 58.

Figure 2:
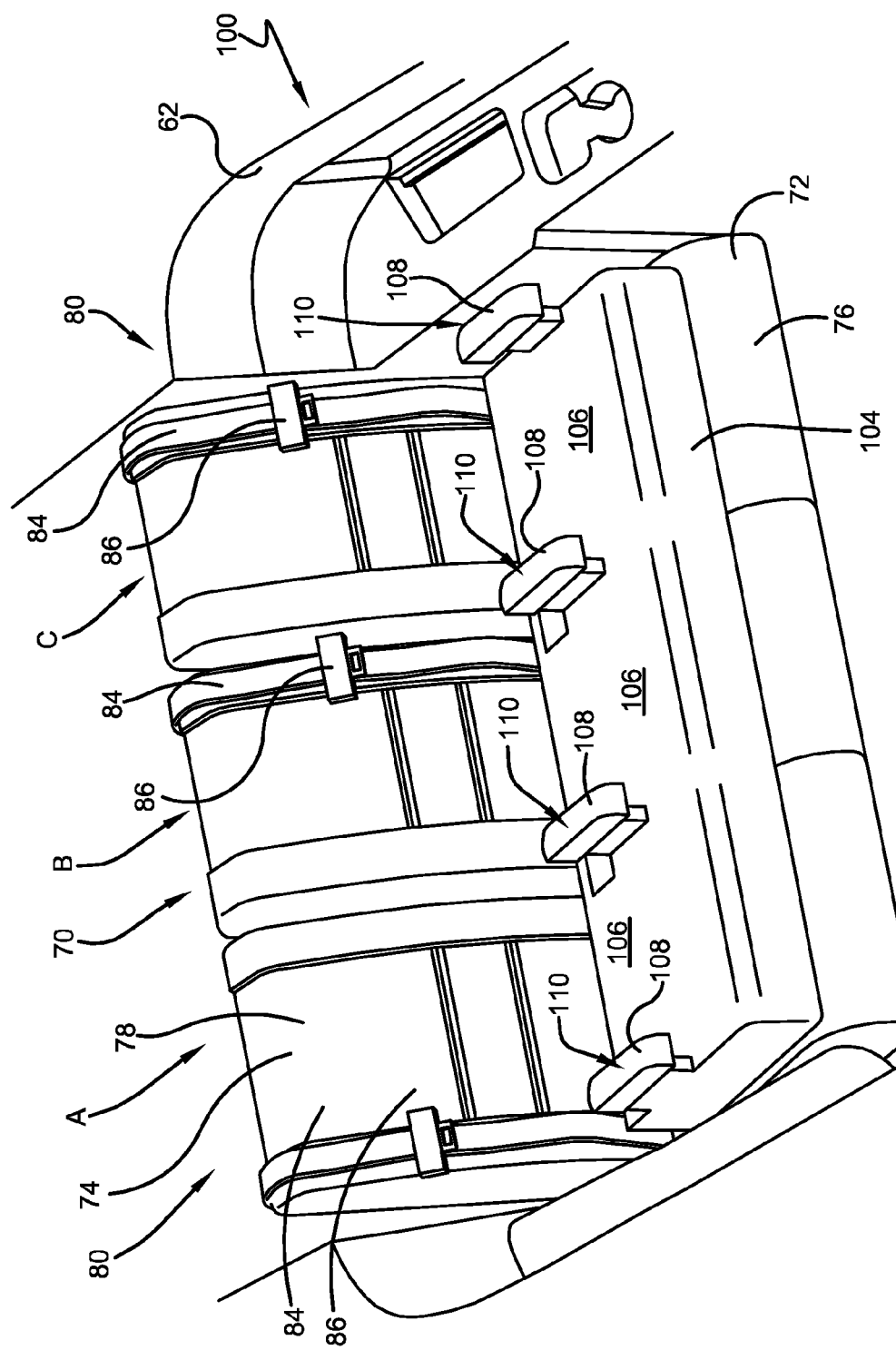
FIG. 2 is perspective front view of a bench seat assembly positioned within the vehicle of FIG. 1 and showing a booster seat assembly placed thereon.
Figure 3:
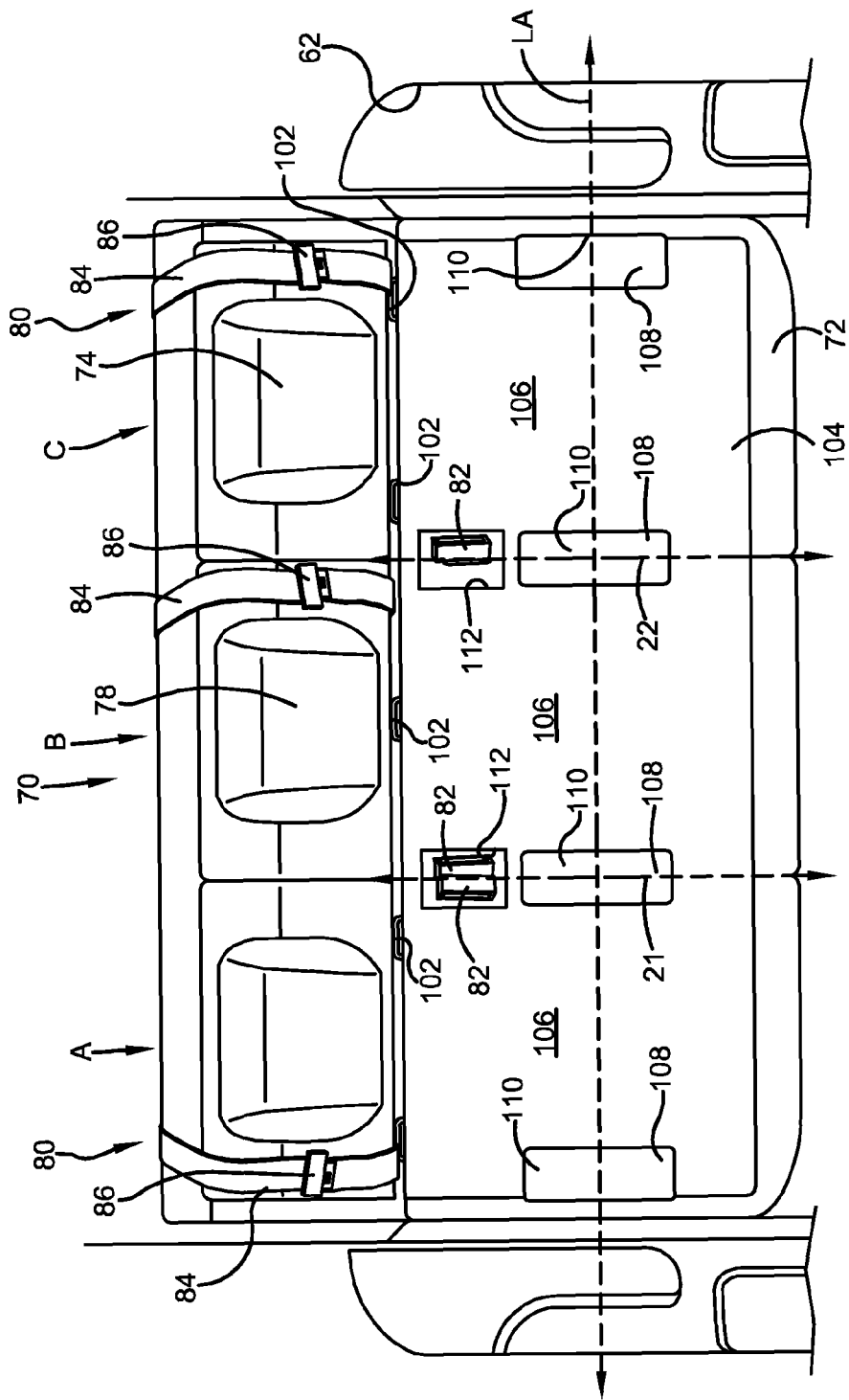
FIG. 3 is a top view of the bench seat assembly of FIG. 2.

With reference now to FIGS. 1-3, within the passenger compartment 62 there may be seats of various types for supporting passengers to the vehicle 50 as is well known to those of skill in the art. The seats may include one or more bucket style seats 68, such as those shown in the front portion of the passenger compartment 62, and one or more vehicle bench seat assemblies 70. As is well known to those of skill in the art, a bench seat assembly 70 comprises a substantially continuous bench seat base portion and a substantially continuous bench seat back portion that is suitable for accommodating two or more occupants. The bench seat assembly 70 shown includes a bench seat base portion 72 including an occupant contact surface 76 and a bench seat back portion 74 including an occupant contact surface 78. The bench seat assembly 70 is suitable for contacting and supporting three adult sized occupants in locations A, B and C. However, it should be noted that embodiments of the booster seat assembly 100 of this invention will work with bench seat assemblies that accommodate two or more occupants.

With reference now to FIGS. 2-3, a seat belt assembly 80 may be provided for each of the occupants (whether adult sized or child sized) and may be used to restrain each of the occupants to the vehicle bench seat assembly 70 as is well known to those of skill in the art. Each seat belt assembly 80 may include a female receptacle 82 that is supported to the frame 52 in a known manner and that extends above the bench seat base portion 72 so that it is accessible by the corresponding occupant. The seat belt assembly 80 may also include a seat belt 84 supported to the frame 52 in a known manner and a male element 86 that is attached to the seat belt 84 and that is latchable to the female receptacle 82 to restrain the occupant and that is unlatchable from the female receptacle 82 to release the occupant. The male element 86 may be fixed to the seat belt 84 or may be movable relative to the seat belt 84. As the operation of seat belt assemblies is well known to those of skill in the art, further details will not be provided here.

With continuing reference to FIGS. 2-3, the booster seat assembly 100 may include a booster seat base portion 104 that is supported to (rests on) the occupant contact surface 76 of the bench seat base portion 72 and that includes an occupant contact surface 106 that is suitable for accommodating two or more child sized occupants. For the embodiment shown, the occupant contact surface 106 is suitable for contacting and supporting three child sized occupants. The booster seat assembly 100 may also include one or more armrests 108 (four shown) that extend from the booster seat base portion 104 and that define child sized occupant seating areas, three such areas shown in the locations A, B and C. Each armrest 108 may have an armrest contact surface 110 as is well known to those of skill in the art. If the booster seat assembly 100 is used with a vehicle bench seat 70 (as noted above, the booster seat assembly 100 may have non-vehicle applications as well) it may include one or more attachment surfaces 102 that are used to support the booster seat assembly 100 to the frame 52 in a known manner.

Still referring to FIGS. 2-3, the booster seat assembly 100 may also have at least one opening 112 (two shown) formed in the booster seat base portion 104 that is used to receive one or more of the female receptacles 82. In this way it is easy for the child sized occupant to access the female receptacle 82 (without the use of seatbelt extender) as well as the corresponding male element 86 for self latching and self unlatching of the corresponding seat belt assembly 80. By "self latching" and "self unlatching" it is meant that the child sized occupant can latch and unlatch the seat belt assembly 80 himself or herself. For the embodiment shown, one opening 112 (on the left as shown in FIG. 3) receives two juxtaposed female receptacles 82 and the second opening 112 (on the right as shown in FIG. 3) receives the third female receptacle 82. The openings 112 can be of any size and shape chosen with the sound judgment of a person of skill in the art. For the embodiment shown, both openings 112 are rectangular shaped and are the same size. While the armrests 108 and openings 112 can be sized and positioned in any manner chosen with the sound judgment of a person of skill in the art, for the embodiment shown each of the openings 112 is substantially aligned with one of the armrests 108 along a longitudinal axis LA of the booster seat base portion 104. Thus lines L1 and L2 bisect corresponding openings 112 and armrests 108 and also are perpendicular to the longitudinal axis LA. Also for the embodiment shown, none of the armrest contact surfaces 110 extend over any portion of the openings 112. This provides easy access of the female receptacle 82 and the corresponding male element 86 by the child sized occupant even when armrests 108 are used.

With reference now to FIGS. 1-3, the operation of the booster seat assembly 100 will now be described. The booster seat base portion 104 is placed onto the occupant contact surface 76 of the bench seat base portion 72 with each opening 112 receiving one (or two) of the female receptacles 82. If the bench seat assembly 70 is supported to a vehicle frame 52, then the attachment surface(s) 102 of the booster seat assembly 100 may be supported to the frame 52. Once the booster seat base portion 104 is installed, one or more child sized occupants may be placed onto the occupant contact surface 106 of the booster seat base portion 104 and against the occupant contact surface 78 of the bench seat back portion 74. Once each child is positioned properly on the booster seat base portion 104, each child can then easily access the corresponding male element 86 and female receptacle 82, without the use of a seatbelt extender, for self latching and self unlatching of the seat belt assembly 80. If the booster seat assembly 100 includes armrests 108, then the child sized occupants sitting next to each other will share an armrest 108 as there will only be one armrest 108 between them. This helps in reducing the required width of the booster seat assembly 100. If it is desired to remove the booster seat assembly 100, the booster seat base portion 104 can be detached from the frame 52 (if applicable) and then removed from the occupant contact surface 76 of the bench seat base portion 72.

Numerous embodiments have been described, hereinabove. It will be apparent to those skilled in the art that the above methods and apparatuses may incorporate changes and modifications without departing from the general scope of this invention. The materials used to make the booster seat assembly can be any chosen with the sound judgment of a person of skill in the art. It is intended to include all such modifications and alterations in so far as they come within the scope of the appended claims or the equivalents thereof.

I claim:

1. A booster seat assembly for use with an associated bench seat assembly comprising:
   a bench seat base portion including an occupant contact surface that is suitable for contacting and supporting at least two associated adult sized occupants;
   a bench seat back portion including an occupant contact surface that is suitable for contacting and supporting the at least two associated adult sized occupants; and for use with an associated seat belt assembly for each of the associated adult sized occupants and suitable for restraining each of the associated adult sized occupants to the bench seat assembly,
   each seat belt assembly comprising:
      a female receptacle that extends above the bench seat base portion;
      a seat belt; and,
      a male element that is attached to the seat belt and that is latchable to the female receptacle to restrain the associated adult sized occupant and that is unlatchable from the female receptacle to release the associated adult sized occupant;
   the booster seat assembly comprising:
      a substantially-horizontal booster seat base portion that is suitable to be supported to the occupant contact surface of the bench seat base portion and that includes an occupant contact surface that is suitable for contacting and supporting at least two associated child sized occupants, the booster seat base portion having a thickness measured in a vertical direction when the booster seat base portion is supported on the occupant contact surface of the bench seat base portion;
      a first opening formed through the booster seat base portion thickness, within which is positioned at least one of the female receptacles;
   wherein the booster seat assembly is suitable to support each associated child sized occupant to the vehicle by contacting each associated child sized occupant to the booster seat base portion and by contacting each associated child sized occupant to the bench seat back portion; and,
   wherein the booster seat assembly is suitable to permit each associated child sized occupant to access: (1) a corresponding male element; and (2) a corresponding female receptacle within the first opening for self latching to restrain the associated child sized occupant and self unlatching of the corresponding seat belt assembly.

2. The booster seat assembly of claim 1 further comprising:
   first, second, and third armrests, each having an armrest contact surface, that extend from the booster seat base portion and that define two child sized occupant seating areas.

3. The booster seat assembly of claim 2 wherein:
   the booster seat base portion has a longitudinal axis;
   the second armrest is positioned between the first and third armrests along the longitudinal axis; and,
   the first opening is substantially aligned with the second armrest along the longitudinal axis of the booster seat base portion.

4. The booster seat assembly of claim 2 wherein:
   the booster seat base portion has a longitudinal axis;
   the second armrest is positioned between the first and third armrests along the longitudinal axis; and,
   the armrest contact surface of the second armrest does not extend over any portion of the first opening.

5. The booster seat assembly of claim 1 wherein the booster seat assembly is suitable to permit each associated child sized occupant to access a corresponding male element and female receptacle for latching and unlatching of the corresponding seat belt assembly without the use of seatbelt extender.

6. The booster seat assembly of claim 1 wherein the associated bench seat assembly is supported to the frame of a vehicle through other than the seat belt assembly, the booster seat assembly further comprising:
an attachment surface, which is not a part of the seat belt assembly, suitable to support the booster seat assembly to the frame.

7. The booster seat assembly of claim 1 wherein:
the associated bench seat base portion includes an occupant contact surface that is suitable for contacting and supporting at least three associated adult sized occupants;
the associated bench seat back portion includes an occupant contact surface that is suitable for contacting and supporting the at least three associated adult sized occupants;
the seat belt assembly is for use with each of the at least three associated adult sized occupants and is suitable for restraining each of the at least three associated adult sized occupants to the vehicle bench seat assembly;
the booster seat base portion includes an occupant contact surface that is suitable for contacting and supporting at least three associated child sized occupants; and,
the booster seat assembly further comprises a second opening formed through the booster seat base portion thickness, within which are positioned at least the other two female receptacles.

8. The booster seat assembly of claim 7 wherein:
the booster seat base portion has a longitudinal axis;
the booster seat assembly further comprises at least four armrests, each having an armrest contact surface, that extend from the booster seat base portion and that define three child sized occupant seating areas; and,
each of the first and second openings are substantially aligned with an armrest along a longitudinal axis of the booster seat base portion.

9. The booster seat assembly of claim 1 wherein:
the first opening extends from a first outer surface of the booster seat base portion to a second outer surface of the booster seat base portion; and
the first opening is oriented such that a line that passes through the center of the first opening at the first outer surface and through the center of the first opening at the second outer surface is substantially vertical when the booster seat is supported on the occupant contact surface of the bench seat base portion.

10. The booster seat assembly of claim 1 wherein two female receptacles are positioned within the first opening.

11. A method comprising the steps of:
(A) providing a bench seat assembly comprising: a bench seat base portion including an occupant contact surface that is suitable for contacting and supporting at least two associated adult sized occupants; and, a bench seat back portion including an occupant contact surface that is suitable for contacting and supporting the at least two associated adult sized occupants;
(B) providing a seat belt assembly for each of the associated adult sized occupants and suitable for restraining each of the associated adult sized occupants to the bench seat assembly, each seat belt assembly comprising: a female receptacle that extends above the bench seat base portion; a seat belt; and, a male element that is attached to the seat belt and that is latchable to the female receptacle to restrain the associated adult sized occupant and that is unlatchable from the female receptacle to release the associated adult sized occupant;
(C) providing a booster seat assembly comprising: a substantially-horizontal booster seat base portion that includes an occupant contact surface that is suitable for contacting and supporting at least two associated child sized occupants, the booster seat base portion having a thickness measured in a vertical direction when the booster seat base portion is supported on the occupant contact surface of the bench seat base portion, and the booster seat base portion having a first opening the booster seat base portion thickness;
(D) placing the booster seat base portion onto the occupant contact surface of the bench seat base portion with at least one of the female receptacles positioned within the first opening;
(E) placing a first child sized occupant onto the occupant contact surface of the booster seat base portion and against the occupant contact surface of the bench seat back portion; and,
(F) permitting the first child sized occupant to access: (1) a corresponding male element and (2) a corresponding female receptacle within the first opening for self latching to restrain the first child sized occupant and self unlatching of the corresponding seat belt assembly.

12. The method of claim 11 wherein:
step (F) comprises the step of: permitting the first child sized occupant to access a corresponding male element and female receptacle for self latching and self unlatching the corresponding seat belt assembly without the use of seatbelt extender.

13. The method of claim 11 further comprising the steps of:
placing a second child sized occupant onto the occupant contact surface of the booster seat base portion and against the occupant contact surface of the bench seat back portion; and,
permitting the second child sized occupant to access: (1) a corresponding male element and (2) a corresponding female receptacle for self latching to restrain the second child sized occupant and self unlatching of the corresponding seat belt assembly.

14. The method of claim 13 wherein:
step (C) comprises the step of providing the booster seat assembly with at least three armrests; and,
the method further comprises the step of: providing only one armrest between the first and second child sized occupants.

15. The method of claim 11 wherein:
step (A) comprises the step of providing the bench seat base portion to be supported to a vehicle frame through other than the seat belt assembly; and,
step (D) comprises the step of supporting an attachment surface of the booster seat base portion, which is not a part of the seat belt assembly, to the vehicle frame.

16. The method of claim 11 wherein:
step (A) comprises the step of: providing the bench seat base portion to include an occupant contact surface that is suitable for contacting and supporting at least three associated adult sized occupants; and providing the bench seat back portion to include an occupant contact surface that is suitable for contacting and supporting the at least three associated adult sized occupants;
step (C) comprises the step of: providing the booster seat base portion to include an occupant contact surface that is suitable for contacting and supporting at least three associated child sized occupants and that has first and second openings through the booster seat base portion thickness; and, step (D) comprises the step of placing the booster seat base portion onto the occupant contact surface of the bench seat base portion with two of the female receptacles positioned within the first opening and the other female receptacle positioned within the second opening.

17. The method of claim 16 further comprising the steps of:
placing a second child sized occupant onto the occupant contact surface of the booster seat base portion and against the occupant contact surface of the bench seat back portion;
permitting the second child sized occupant to access: (1) a corresponding male element and (2) a corresponding female receptacle for self latching to restrain the second child sized occupant and self unlatching of the corresponding seat belt assembly;
placing a third child sized occupant onto the occupant contact surface of the booster seat base portion and against the occupant contact surface of the bench seat back portion; and,
permitting the third child sized occupant to access: (1) a corresponding male element and (2) a corresponding female receptacle for self latching to restrain the third child sized occupant and self unlatching the corresponding seat belt assembly.

18. The method of claim 17 wherein:
step (C) comprises the step of providing the booster seat assembly with at least four armrests; and,
the method further comprises the steps of: providing only one armrest between the first and second child sized occupants and providing only one armrest between the second and third child sized occupants.

19. The method of claim 18 wherein the method further comprises the steps of:
permitting the first child sized occupant to access: (1) a corresponding male element and (2) a corresponding female receptacle for self latching to restrain the first child sized occupant and self unlatching of the corresponding seat belt assembly without the use of seatbelt extender;
permitting the second child sized occupant to access: (1) a corresponding male element and (2) a corresponding female receptacle for self latching to restrain the second child sized occupant and self unlatching of the corresponding seat belt assembly without the use of seatbelt extender; and,
permitting the third child sized occupant to access: (1) a corresponding male element and (2) a corresponding female receptacle for self latching to restrain the third child sized occupant and self unlatching of the corresponding seat belt assembly without the use of seatbelt extender.

* * * * *